United States Patent [19]

Tomchak

[11] 4,085,728

[45] Apr. 25, 1978

[54] SOLAR ENERGY HEATER

[76] Inventor: Sigfrid A. Tomchak, 16896 Lolo Cir., Fountain Valley, Calif. 92708

[21] Appl. No.: 714,691

[22] Filed: Aug. 16, 1976

[51] Int. Cl.² .................................................. F24J 3/02
[52] U.S. Cl. ...................................... 126/270; 165/76; 165/170
[58] Field of Search ............... 126/270, 271; 237/1 A; 165/76, 137, 170

[56] References Cited

U.S. PATENT DOCUMENTS

| 3,012,762 | 12/1961 | Norris | 165/137 |
|---|---|---|---|
| 3,055,642 | 9/1962 | Cox et al. | 165/170 |
| 3,327,776 | 6/1967 | Butt | 165/170 |
| 3,799,145 | 3/1974 | Butterfield | 126/271 |
| 3,952,724 | 4/1976 | Pei | 126/271 |
| 3,996,918 | 12/1976 | Quick | 126/270 |

FOREIGN PATENT DOCUMENTS

| 1,328,372 | 8/1973 | United Kingdom | 126/271 |

*Primary Examiner*—Kenneth W. Sprague
*Attorney, Agent, or Firm*—G. Donald Weber, Jr.

[57] ABSTRACT

There is described an improved, modular, solar energy converting unit which operates as a solar heater. The modular heater incorporates upper and lower surfaces and a prescribed chamber therebetween. The chamber is defined by a plurality of walls or baffles which are substantially parallel and, alternately, extend from opposite sides of the modular unit. In addition, a sinuous, continuous rib member is arranged intermediate adjacent areas of said baffles while providing an interconnection which is spaced from the free end of alternate ones of the baffles. Each of the side walls includes portions which may be selectively interconnected with other portions of adjacent modules. In addition, each of the side walls includes means for aligning and interlocking adjacent modules. Additional support members are provided, to the extent necessary, wherein the module is capable of supporting substantial weights and may be used as a surface decking or the like.

7 Claims, 5 Drawing Figures

SOLAR ENERGY HEATER

BACKGROUND

1. Field of the Invention

This invention relates generally to the collection of radiant solar energy in the form of useful heat and to a means for converting the solar energy into a fluid heater.

2. Description of Prior Art

It is well known that the energy of sunlight is quite extensive and can be on the order of 300 Btu of heat per square foot per hour. The solar energy is substantially free and many attempts have been made to harness this energy for performing useful work for mankind. For the most part, these attempts have been experimental and scientific curiosities. However, several commercial devices have been produced. These devices generally fall within the field of a solar heater, particularly heaters for water. However, in the past these heater elements have generally been relatively large, cumbersome devices adapted for use on rooftops or the like. Moreover, most of the known devices have poor records in terms of useful life (about 2 years), efficiency (about 10%) and maintenance.

Typical of prior art solar energy heating units are several U.S. patents which have been discovered by applicant during a search of the art. Patents which are considered as related to this field are as follows: U.S. Pat. Nos. 991,161, McHenry; 2,519,281, Presser et al.; 2,680,437, Miller; 2,680,565, Lof; 3,239,000, Meagher; 3,277,884, Rowekamp; 3,399,664, Suhay; and 3,927,208, Katz et al. However, none of the devices shown and described by the noted references show or suggest the specific structure of applicant's modular solar energy heating unit.

SUMMARY OF THE INVENTION

There is described a modular solar heating unit which provides a circuitous path for a fluid to pass therethrough. The modular unit is adapted to be carefully aligned and interlocked to provide interconnection of a plurality of units to increase the fluid path therethrough. Upper and lower surfaces are appropriately designed to permit solar energy to be attracted and retained by the unit. A plurality of substantially parallel baffles or walls extend from opposite sides of the module but short of the opposite side. A continuous heat sink or rib is interwoven through the baffles in a continuous element. The module is uniquely adapted for utilization as a support surface or deck because of the construction thereof.

BRIEF DESCRIPTION OF THE PREFERRED EMBODIMENT

Figure 1:
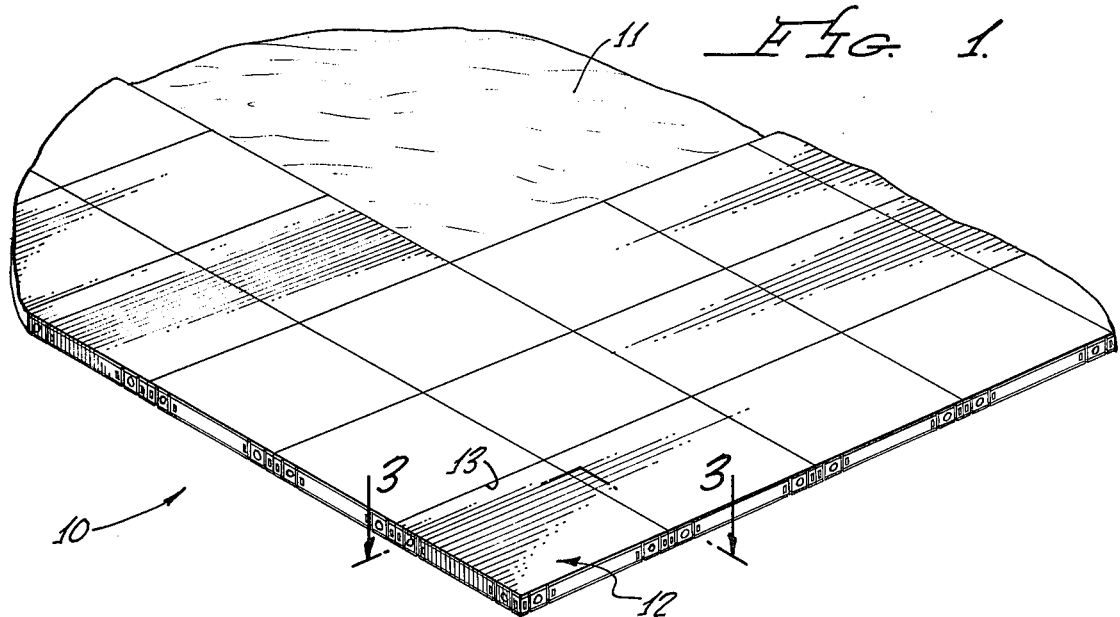
FIG. 1 is a perspective view of a plurality of the modules interconnected to form a decking arrangement.

Referring now to FIG. 1, there is shown a perspective view of a plurality of the modules or "tiles". In this particular application, the tiles are used to form a decking, for example for a swimming pool or the like. In this particular configuration, a plurality of tiles 12 are joined together at interface 13 to provide a decking 10 adjacent to swimming pool 11 or the like. While this utilization or application of the modules or tiles is suggested, it is understood that other utilizations and/or configurations of decking can be utilized. In addition, suitable apparatus can be utilized for providing the pumping and filtration activities relative to water in pool 11 and deck 10. These activities are performed by standard equipment and need not be described in detail here.

Figure 2:
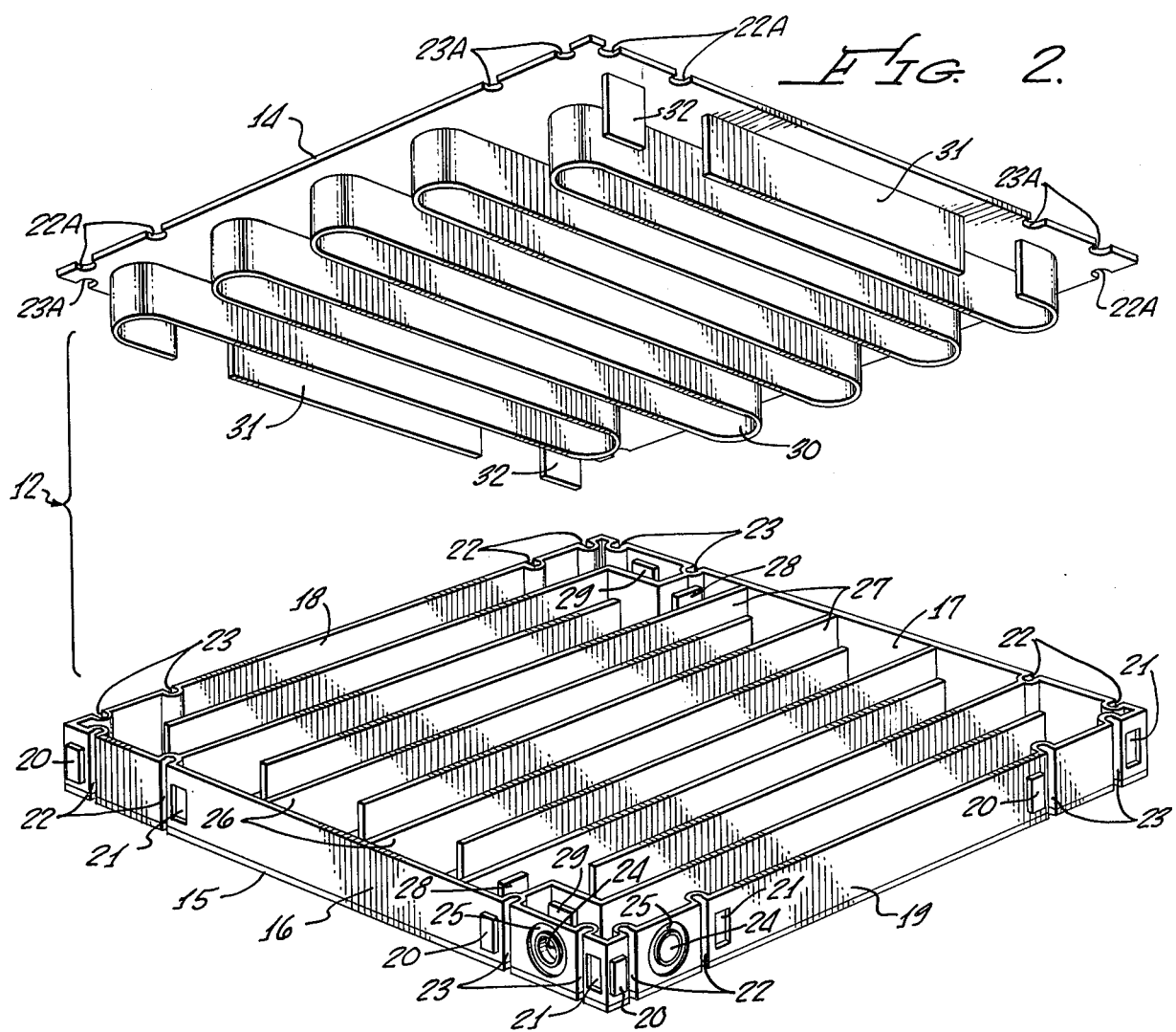
FIG. 2 is an exploded view of a single module or tile.

Referring now to FIG. 2, there is shown an exploded view of a single tile 12. In a typical construction, the tile has top and bottom surfaces 14 and 15, respectively. In practice, surfaces 14 and 15 will be substantially identical in configuration. In a preferred embodiment, top surface 14 may be made of a heat absorptive material. For example, surface 14 may be a dark, rough surface. In the alternative, top surface 14 can be transparent to sunlight while bottom surface 15 is absorptive of sunlight in order to trap and retain optimum amounts of impinging solar energy. Of course, other arrangements can be effected.

Four sides 16, 17, 18 and 19 of the tile or module are provided. These sides are substantially completely identical. This permits better modularity and ease in construction. Each of the sidewalls 16–19 is, initially, affixed to the bottom surface and, ultimately, to upper surface 14. Of course, the sides and the respective surface may be integrally formed, as for example by molding as a single unit. Each of the sidewalls includes at least one projection 20 and one depression 21. In the embodiment shown, two pairs of projections 20 and depressions 21 are provided on each side wall. As shown, each projection/depression pair is disposed adjacent a knockout 24 described infra. The projection 20 is, typically, a protruding portion of the associated sidewall which is formed during the formation of the sidewall. This projection extends outwardly from the respective sidewall. As shown, projections 20 are typically substantially rectangular elements although any configuration which is easily provided can be utilized. Moreover, to obtain greater shear strength the projection/depression is vertically disposed.

Depression 21 is a "blind" aperture in each of sidewalls 16–19. Depression 21 is arranged to have dimensions substantially similar to the dimensions of projection 20. Thus, it is seen that projection 20 from one tile is in alignment with and engages depression 21 in an adjacent tile. Thus, projection 20 and depression 21 operate to align adjacent tiles.

In addition, each sidewall includes two knockout elements 24, preferably disposed at opposite ends of the sidewall. Typically, these elements comprise portions of the sidewalls which are scored such that portion 24 can be selectively removed or "knocked-out". With element 24 in place, a solid wall is provided. With element 24 removed, an aperture is provided wherein fluid from one tile can pass to another tile through a similarly removed knock-out portion. Surrounding each of the knock-out portions is an annulus 25 into which a suitable O-ring or the like can be placed. The annulus is arranged to receive an O-ring in typical fashion such that an appropriate seal can be formed between the knocked-out apertures of adjacent tiles. Of course, the seal may have any desirable shape such as oval or the like.

Figure 5:
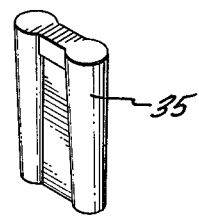
FIG. 5 is a perspective view of an interconnecting element used for clamping adjacent modules or tiles together.

In addition, each of the sidewalls 16–19 includes two pairs of locking keyways 22 and 23. Each pair of locking keyways is disposed on opposite sides of the knock-out portion 24. The locking keyways are arranged to align with and interact with locking keyways in an adjacent tile when appropriate locking pins or keys (see FIG. 5) are inserted. By utilizing a pair of locking keys on opposite sides of the aperture, the tiles can be positively and tightly interconnected whereby a seal formed by the O-ring in annulus 25 is made secure and water tight.

A first plurality of walls or baffles 26 are joined to one of the sidewalls, for example sidewall 16. The baffles 26 are joined to sidewall 16 and surface 15 and extend toward opposite sidewall 17. However, baffles 26 fall short of opposite wall 17. Similarly, a second plurality of walls or baffles 27 is joined to sidewall 17 and bottom surface 15. Baffles 27 extend from wall 17 toward, but short of, wall 16. Consequently, a trough or channel is formed between baffles 26 and 27. This channel is continuous from one corner of the tile to the diametrically opposite corner. In addition, any knock-out portion 24 can be used as the access port to the channel.

In diametrically opposite corners, the end baffle is appropriately interconnected with the sidewalls so as to permit each of the knock-out portions 24 to communicate with the same location in the channel. This arrangement may include an offset arrangement in one or more of the baffle walls. Moreover, by so arranging the baffle wall, additional vertical support is provided for upper surface 14. Likewise, if desired, short support stubs 28 and 29 may be arranged and provided in the corners of the tile in order to support or provide additional support. However, any of the illustrated support members may be omitted or additional support members may be provided as deemed necessary.

Attached to upper surface 14 is a substantially continuous rib member 30. Rib member 30 comprises a plurality of elongated, substantially parallel lengths or runs. The parallel lengths are joined at alternate ends by an arcuate or curved portion wherein rib 30 comprises a single elongated, continuous, sinuous rib member. Sinuous rib 30 has elongated portions interposed between baffles 26 and 27 while the arcuate or curved end portions thereof are disposed between the end of the respective baffle 26 or 27 and the opposite wall 16 or 17, respectively. Thus, rib 30 has the effect of traversing substantially all of the channel defined by baffles 26 and 27 and the respective sidewalls 16–19. In the embodiment wherein surface 14 is absorptive, rib member 30 functions as a heat sink or heat exchanger between surface 14 and the fluid in the channels.

Again, support structures 31 and 32 are joined to surface 14 in a suitable manner to provide suitable support for surface 14 to the extent they may be necessary. These support structures are formed at surface 14 to provide support for upper surface 14, if necessary. In some configurations, such support structures may be unnecessary. In other configurations these support structures may be necessary and/or desirable. Moreover, the specific configuration of the support structures is not limitative of the invention and may, in fact, be formed along with rib 30 or any other elements. Notches 22A and 23A are provided in surface 14. The notches mate with slots 22 and 23 in the sidewalls in order to permit locking keys to be inserted therein.

While, in the exploded view, the device is shown such that rib 30 is joined to surface 14 and baffles 26 and 27 along with sidewalls 16–19 are joined to bottom surface 15, it should be understood that these elements are all joined together in the final version. Thus, the bottom surface of rib 30 is, preferably, joined to and affixed to the bottom surface 15 while the upper edge of baffles 26 and 27 as well as the sides 16–19 are joined to upper surfaces 14. Thus, the completely self-contained module is provided. In addition, it should be noted that some of the elements may be joined together or they may be formed as an integral unit.

Figure 3:
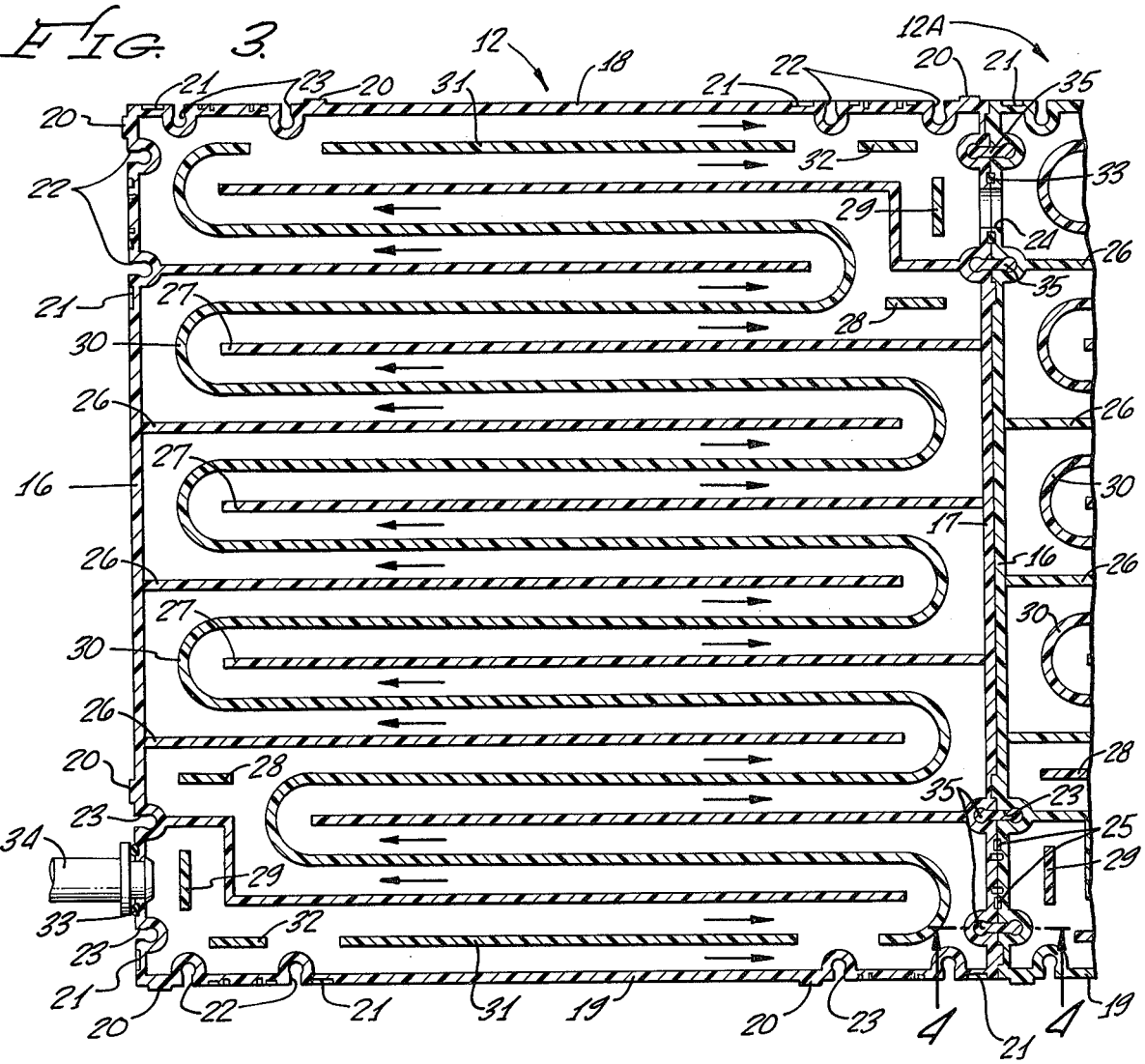
FIG. 3 is a top view of a module or tile and a portion of another tile taken along the lines 3—3 of FIG. 1.

Referring now to FIG. 3, there is shown the interconnection of a pair of adjacent modules or tiles. Elements which are shown in other views bear similar reference numerals in FIG. 3. Thus, tiles 12 and 12A are shown joined together. The left side of tile 12A is identical to the left side of tile 12 in order to provide a single continuous loop from inlet 24 to a suitable outlet (not shown) in tile 12A. Of course, other arrangements of the tile can be provided wherein the path described by the adjacent tiles is altered.

In the embodiment shown, knock-outs 24 in the upper right-hand corner of tile 12 and the upper left-hand corner of tile 12A have been removed. A suitable O-ring 33 is inserted into annulus 25 and appropriate locking pins 35 are inserted. These locking pins, as described hereinafter, operate to pull tiles 12 and 12A toward each other and to assert pressure on O-ring 33 in annulus 25. The knock-out portions 24 in the lower right and lower left hand corners of tiles 12 and 12A, respectively, have not been removed. Consequently, an O-ring 33 is not essential in annulus 25. Locking pins 35 are inserted, nevertheless, in order to maintain the tiles in close proximity. The projection and depression 20 and 21, respectively, are mated on the abutting walls 16 and 17 of tiles 12A and 12, respectively. Thus, it is clear that water or other fluid may enter (or exit) through pipe 34. The fluid flows through the channel defined by baffles 26 and 27 as suggested by the arrows. Rib 30 is immersed in this fluid to provide a heat-sink arrangement such that heat from the upper surface 15 is transmitted to the fluid in an efficient manner. The support members are disposed in a suitable manner to provide additional support, to the extent necessary, in corners of the tile.

Figure 4:
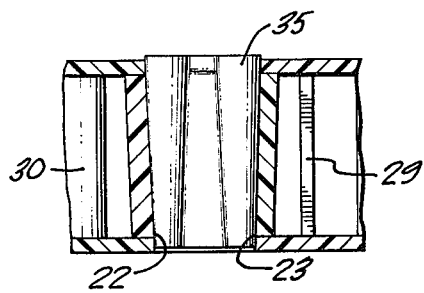
FIG. 4 is an enlarged cross-sectional view of a portion of the interconnecting element taken along the lines 4—4 of FIG. 3.

Referring now to FIG. 4, there is shown a cross-sectional view of the interlocking arrangement taken along lines 4—4 of FIG. 3. Concurrent reference is made to FIG. 5 which shows are perspective view of locking pin 35. Locking pin 35 comprises a pair of tapered, substantially conical elements joined together by a thin web portion. The tapered element fit within suitable mounting keyways 22 or 23 in the sidewalls of a tile. The keyways 22 and 23 are tapered in such a manner that insertion of locking pin 35 causes a wedging action wherein the sidewalls of the tile are drawn more closely together. This type of wedging action causes the tiles to be drawn into close proximity and in tight abutment to force sidewalls together. Moreover, O-ring 33 in annular groove 25 is effective to produce a secure, water-tight seal between components such as adjacent tiles or the input and output elements.

Thus, there has been shown and described a modular tile arrangement for utilization as a solar heating element. This arrangement is designed to provide a unique device for utilizing solar energy for heating a fluid or liquid. The device is completely modular so that a plurality of such devices can be interconnected in virtually any arrangement to provide a substantially continuous path for the fluid to be heated. A heat sink type rib is inserted into the fluid channel to provide a more efficient utilization of the heating energy generated by the solar source. This tile is adapted to be utilized as a decking arrangement, for example, with a swimming pool or the like. The tile may be inserted into any suitable support structure or placed on top of existing decking. Suitable ramp-like members can be associated with the edges of the tile to minimize the abruptness of the edge thereof. These modules permit relatively easy construction. The techniques involved may include a suitable adhesive, sonic welding or the like. It is contemplated that the modules will be made of a suitable plastic material, such as styrene, acrylics, polypropylene or the like. Of course, use of ceramics, glass or any other suitable material is contemplated. In addition, while not specifically shown, surface 14 may have a suitably roughened texture for safety if the modules are used as a decking component. As noted, it is contemplated that those skilled in the art will devise or conceive modifications to the specific configuration shown and described. However, any such modifications which fall within the purview of this description are intended to be included as well. The description herein is intended to be illustrative only and is not limitative of the invention. The scope of the invention is defined by the claims appended hereto.

Having thus described a preferred embodiment of the invention, what is claimed is:

1. A modular energy cell comprising
   first and second surfaces,
   a plurality of side members connected to peripheral edges of said first and second surfaces to form a cavity therein,
   at least a first baffle wall attached to one of said side members and extending toward the opposite side member,
   at least a second baffle wall attached to said opposite side member and extending toward said one side member,
   a continuous rib member attached to at least one of said first and second surfaces,
   said rib member including a plurality of elongated portions and a plurality of arcuate portions,
   said elongated portions disposed in spaced, parallel relationship to and on each side of each said baffle wall,
   said arcuate portions disposed around the free end of the respective one of said baffle walls and spaced from said side members, said arcuate portions connected to said elongated portions to form a continuous rib member having a sinuous configuration, and
   alignment means on each of said side members,
   said alignment means comprises a projection from and a depression in each of said side members such that adjacent solar energy cells can be joined together in an interlocking array.

2. The solar energy cell recited in claim 1 including
   at least one removable portion in at least one of said side members such that an aperture is provided in said side member when said portion is removed.

3. The solar energy cell recited in claim 2 including
   a recessed groove around said aperture for receiving a suitable sealing means.

4. The solar energy cell recited in claim 1 wherein
   said cell is substantially fluid tight, and
   fluid means in said cavity.

5. The solar energy cell recited in claim 1 including
   support means inserted between said first and second surfaces to provide structural strength therebetween.

6. The solar energy cell recited in claim 1 wherein
   said first and second baffle walls are connected to said first and second surfaces to define a channel in said cavity and to provide structural strength in said cell.

7. The solar energy cell recited in claim 1 wherein
   at least one of said first and second surfaces is a heat absorbing material, and
   said rib member forms a heat sink attached to said at least one surface which is heat absorbing material.

* * * * *